United States Patent

[11] 3,591,848

[72] Inventor James C. Otto
Scottsdale, Ariz.
[21] Appl. No. 747,702
[22] Filed July 25, 1968
[45] Patented July 6, 1971
[73] Assignee General Electric Company

[54] PARAMETRIC AMPLIFIER EMPLOYING SELF-BIASED NONLINEAR DIODES
5 Claims, 3 Drawing Figs.

[52] U.S. Cl. .......... 307/88.3, 330/4.5, 330/127
[51] Int. Cl. .......... H03f 7/04
[50] Field of Search .......... 330/4.5; 307/88.3

[56] References Cited
UNITED STATES PATENTS

| | | | |
|---|---|---|---|
| 3,185,914 | 5/1965 | Gunn | 330/4.9 |
| 3,197,708 | 7/1965 | Pan | 330/4.9 |
| 3,249,881 | 5/1966 | DeNiet | 330/4.9 |
| 3,264,488 | 8/1966 | McGrogan | 330/4.9 |
| 3,316,421 | 4/1967 | Biard | 330/4.9 |
| 3,346,740 | 10/1967 | Brobst et al. | 330/4.9 |
| 3,388,263 | 6/1968 | Daniel | 330/4.9 |
| 3,433,976 | 3/1969 | Marechal | 330/4.9 |

*Primary Examiner*—Roy Lake
*Assistant Examiner*—Darwin R. Hostetter
*Attorneys*—Marvin A. Goldenberg, Richard V. Lang, Frank L. Neuhauser, Oscar B. Waddell and Melvin M. Goldenberg

ABSTRACT: A parametric device that may be employed as an amplifier or frequency converter relative to a given input signal, exhibiting a high input impedance for use with a high impedance signal source. The device includes a pair of nonlinear diodes connected in a balanced circuit configuration and biased in the backward direction by application of a pump signal. A balance control arrangement is provided to compensate for diode and circuit nonuniformities.

PATENTED JUL 6 1971 3,591,848

INVENTOR:
JAMES C. OTTO,
BY Marvin L. Goldenberg
HIS ATTORNEY.

PARAMETRIC AMPLIFIER EMPLOYING SELF-BIASED NONLINEAR DIODES

BACKGROUND OF THE INVENTION

1. Field of the Invention

The invention relates to the field of low noise parametric amplifiers and frequency converters of the nonlinear diode type.

2. Description of the Prior Art

Diode parametric devices are inherently low noise devices for providing amplification and/or conversion of an input signal wherein a pump signal of higher frequency is mixed with the input signal so as to transfer energy thereto. Mixing occurs across the diodes, typically varactor diodes, which are biased in the backward direction so as to exhibit a nonlinear operation, the diode capacitance varying nonlinearly with applied voltage. In these circuits it is conventional to supply the backward bias by means of a DC network, including biasing resistors which contribute prominently to the input impedance of the device. The biasing resistors establish a limitation with respect to the maximum value of the input impedance. Accordingly, DC bias arrangements are unsuitable where an input signal source of extremely high impedance is employed, which must be matched by the input impedance of the parametric device. The result of the impedance mismatch is a poor noise figure for the device. The present invention appreciably increases the input impedance of these devices over that which has been available heretofore.

SUMMARY OF THE INVENTION

It is accordingly an object of the invention to provide a novel parametric device exhibiting an extremely high input impedance for obtaining good noise performance when used with a high impedance signal source.

It is another object of the invention to provide a novel parametric device of the nonlinear diode type which does not require a DC bias network for backward biasing said diodes.

It is a further object of the invention to provide a parametric device as above described wherein the nonlinear diodes are arranged in a balanced configuration and which employs a self-biasing arrangement of said diodes.

It is another object of the invention to provide a parametric device as described which includes a balance control network for maintaining a balanced operation of the circuit.

Another object of the invention is to provide a parametric device as described which exhibits a low input capacitance.

A further object of the invention is to provide a parametric amplifier as above described suitable for use over a wide range of frequencies extending from the audio range.

These and other objects of the invention are accomplished by a parametric circuit which may be employed as an amplifier or frequency converter, including a pair of nonlinear diodes arranged in a balanced configuration, each diode having a capacitor in series therewith. A source of pump energy of frequency $\omega_p$ is coupled to the diode circuit and charges the capacitors so as to establish a backward bias voltage across the diodes. In addition, a source of signal energy of frequency $\omega_s$, where $\omega_p >> \omega_s$, is coupled to the diode circuit and mixes with the pump energy across the diodes so as to generate modulation products of the frequencies $\omega_p$ and $107_s$. The balanced configuration of the diodes provides substantial cancellation of the pump signal at the output of the diodes. Filter means are provided at the output for passing only the sideband frequency components $\omega_p+\omega_s$ and $\omega_p-\omega_s$.

Because a perfect matching of diode properties and balancing of the diode circuit cannot be accomplished there will tend to be some residual pump signal at the diode output, which is undesirable. In accordance with a further aspect of the invention a balancing network is provided for introducing to the diode output a balance signal of opposite phase and equal amplitude to the residual pump signal for nulling out said pump signal.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

DESCRIPTION OF THE PREFERRED EMBODIMENTS

Figures 1, 2, 3:
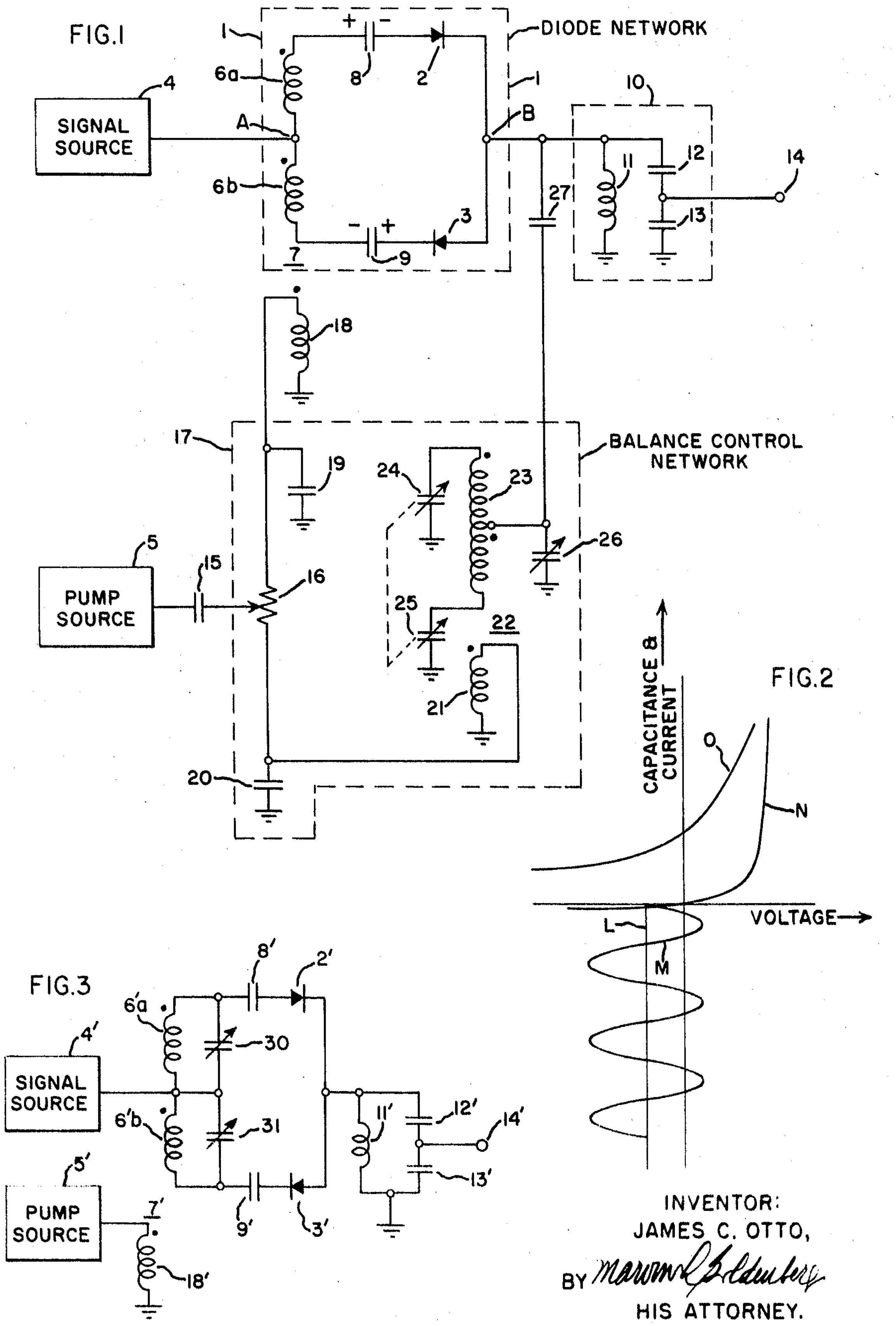
FIG. 1 is a schematic diagram of a first embodiment of a parametric device in the form of an up-converter, in accordance with the invention.
FIG. 2 is a curve employed in the description of the operation of FIG. 1.
FIG. 3 is a schematic circuit diagram of a second embodiment of a parametric device which is a modification of the device of FIG. 1.

With reference to FIG. 1 there is illustrated a parametric device operating in the form of an up-converter. In accordance with the invention, the device is connected in a circuit configuration which provides an extremely high input impedance, e.g., on the order of 1 to several thousand megohms, for matching a signal source of comparably high impedance and thereby obtaining a good noise figure.

The device includes a diode network 1 having a pair of nonlinear diode elements 2 and 3 to which are coupled signal and pump energy from sources 4 and 5, respectively. The pump energy is at frequency $\omega_p$ and the signal energy at $\omega_s$, where normally $\omega_p >> \omega_s$. The diode elements 2 and 3, typically varactor diodes, are connected in a balanced arrangement so as to provide at the output of the diode network, energy at the sum and difference frequencies and substantial cancellation of energy at the pump frequency.

Signal source 4, which may be of conventional type having a high source impedance, is shown in block form. The source 4 is connected to the input of the diode network 1 at point A, which is at the junction of secondary windings 6*a* and 6*b* of transformer 7. A capacitor 8 is in series with diode 2 and together they connect the external terminal of winding 6*a* to the output of the diode network at point B, diode 2 being poled to conduct current away from point B. Point B is coupled to an output filter network 10 which passes the upper and lower sideband frequencies $\omega_p \pm \omega_s$. More specifically, point B is connected through an inductor 11 to ground and through the series connection of capacitors 12 and 13 to ground, the output being taken from the junction of the capacitors at output terminal 14.

It may be seen that the diode network is in series for the input signal, so that the input capacitance of the device may be made low, on the order of several picofarads, thereby improving the frequency response of the device.

Pump source 5, a conventional component shown in block form, is connected through a coupling capacitor 15 to a tap on a variable resistor 16 of a balance control network 17, which applies an AC balance signal to point B. The balance signal compensates for energy at the pump frequency not cancelled by the diode network. One terminal of potentiometer 16 is connected to the primary winding 18 of transformer 7 for coupling pump energy to the diode network 1. Said one terminal of potentiometer 16 is also connected through a capacitor 19 to ground and the opposite terminal is connected through a capacitor 20 to ground. Potentiometer 16 and capacitors 19 and 20 provide a phase control of the balance signal. The opposite terminal of potentiometer 16 is further connected to the primary winding 21 of a balance control transformer 22. Transformer 22, preferably of similar frequency response to transformer 7, has a secondary winding 23, the end terminals of which are connected to ground through mechanically ganged variable capacitors 24 and 25, respectively. The center tap of winding 23 is connected through a variable capacitor 26 to ground and through a coupling capacitor 27 to point B. Adjustment of the capacitors 24, 25 and 26 control the polarity and amplitude of the balance signal. Preferably, transformers 7 and 22 have closely matched frequency responses so that the balance is maintained notwithstanding variations in pump frequency.

For a given embodiment of the circuit of FIG. 1 the following circuit components and values may be considered typical:

| | |
|---|---|
| Diodes 2 and 3 | MSE 2501 |
| Capacitors 8 and 9 | 500 picofarads |
| Capacitor 12 | 15 picofarads |
| Capacitor 13 | 91 picofarads |
| Capacitor 15 | 0.01 picofarads |
| Capacitors 19 and 20 | 30 picofarads |
| Capacitors 24 and 25 | 1—6 picofarads |
| Capacitors 26 | 1—5 picofarads |
| Capacitor 27 | 2 picofarads |
| Potentiometer 16 | 300 ohms |
| Inductor 11 | 5 microhenries |
| Transformers 7 and 22 | primary—10 turns No. 30 wire, one-half inch coil form |
| | secondary—20 turns No. 30 wire, one-half inch coil form |
| $\omega_s$ | DC to 20 kHz. |
| $\omega_p$ | 20 MHz. |

In the operation of the circuit of FIG. 1, the pump signal is coupled through transformer 7 to the diode network 1 and accomplishes a self biasing of the diodes 2 and 3 by means of a substantially unidirectional current flow through the diodes which charges capacitors 8 and 9 to the polarities indicated. The backward bias is at a level approximately one-half the peak to peak magnitude of the pump signal, as represented by the bias line L in FIG. 2. With only the pump signal applied, the voltage across the diodes will vary as a function of the pump signal so as to provide but slight forward conduction through the diodes, which may be seen from voltage curve M and voltage-current curve N in FIG. 2. This operation maintains the bias at the optimum level for maximum gain and minimum noise, independent of pump signal amplitude. However, for a pump signal of constant amplitude, the bias level will be essentially constant.

Due to the balanced arrangement of the diodes the pump signal variations across the diodes substantially cancel out at the diode network output, at point B. However, as previously mentioned, because the circuit is normally not perfectly balanced there tends to be some residual pump signal present at point B.

Variations in diode voltage produce corresponding variations in diode capacitance, indicated by the voltage-capacitance curve O. Accordingly, upon application of the input signal, which is at a frequency and magnitude much less than the pump signal, a mixing action occurs across the diodes producing modulation products at point B. In the mixing process energy is transferred from the pump signal to the modulation product signals.

The residual pump signal tending to appear at point B is nulled out by an AC balance signal applied through transformer 22. The polarity and magnitude of the balance signal is controlled by adjustment of capacitors 24, 25 and 26. Capacitors 24 and 25 are mechanically ganged so that as one is increased in capacitance the other is decreased, performing a voltage division. They accordingly determine the polarity of the balance signal and provide a gross adjustment of its magnitude. Capacitor 26 provides a fine adjustment of balance signal magnitude. The phase of the balance signal is controlled by adjustment of potentiometer 16.

It is noted that, when required, the input signal, in amplified form, can be recovered from the up-converted signal appearing at output terminal 14 by means of conventional detection techniques.

In addition to providing a precise balancing out of the pump frequency, the circuit arrangement of FIG. 1 separates the control function from the basic parametric function. Accordingly, the diode network may be physically isolated and the balance adjustment made from a remote point. In one operable embodiment of the circuit, the diode network was placed in a Dewar vessel and maintained at liquid helium temperatures for further reducing the noise figure. The balance control network 17 was at ambient temperatures and coupling of the pump energy to the diode network was made by means of an air core transformer.

In FIG. 3 there is illustrated a further embodiment of the invention wherein the balance control of the pump signal is effected at the secondary winding of the transformer 7'. Components similar to those found in FIG. 1 are similarly identified but with a prime notation. Accordingly, pump signal source 5' is coupled, as previously, to the balanced diode arrangement including diodes 2' and 3' and capacitors 8' and 9'. Input signal source 4' is connected to the junction of secondary winding 6'*a* and 6'*b*. A pair of adjustable capacitors 30 and 31 are connected in shunt with the secondary windings. The adjustment of capacitors 30 and 31 is employed to null out any pump signal component at the diode output. The operation of the circuit of FIG. 3 is otherwise similar to that of FIG. 1 and will not be further discussed.

The appended claims are intended to include within their definition all modifications and variations of the specifically described circuitry that may reasonably be said to fall within the scope of the present invention.

What I claim as new and desire to secure by Letters Patent of the United States is:

1. A parametric device comprising:
a. a balanced diode network having an input terminal and an output terminal, said network including, a1. a winding having a center tap which forms said input terminal,
a2. the series connection of a first capacitor and first nonlinear diode connected between one end terminal of said winding and said output terminal,
a3. the series connection of a second capacitor and second nonlinear diode connected between other end terminal of said winding and said output terminal, said first and second diodes being poled in opposite directions,
b. a pump source for generating a pump signal of frequency $\omega_{p'}$
c. a transformer including said winding for providing inductive coupling of said pump signal to said diode network so as to provide voltage variations across tHe diodes which substantially cancel at said output terminal, said capacitors being responsive to said pump signal for applying a backward bias voltage across said diodes,
d. a high impedance input source for generating an input signal of frequency $\omega_{s'}$ where $\omega_s<\omega_{p'}$ and
e. means for directly connecting said input source to said input terminal for mixing said input signal and said pump signal across said diodes so as to produce modulation products of the frequencies $\omega_p$ and $\omega_s$ at said output terminal.

2. A parametric device as in claim 1 wherein there tends to be some residual signal at the pump frequency present at said output terminal due to unavoidable imbalances of said diode network, which includes balance means for nulling out said residual signal.

3. A parametric device as in claim 2 wherein said balance means includes a balance network for generating a balance signal of equal magnitude and opposite phase to said residual signal and third means for coupling said balance signal to said output terminal.

4. A parametric device as in claim 3 wherein said balance network is responsive to said pump signal and includes a voltage divider for determining polarity and magnitude of said balance signal and phase control components for accurately determining phase.

5. A parametric device as in claim 2 wherein said balance means includes a pair of adjustable capacitors in shunt with the two halves of said winding.